US009185454B2

(12) United States Patent
Kreth et al.

(10) Patent No.: US 9,185,454 B2
(45) Date of Patent: Nov. 10, 2015

(54) SYSTEM AND METHOD FOR PRESENTING DURING A PROGRAMMING EVENT AN INVITATION TO FOLLOW CONTENT ON A SOCIAL MEDIA SITE

(75) Inventors: William Eric Kreth, New York, NY (US); Scott Miller, Doylestown, PA (US); Vipul Patel, Upper Holland, PA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 1209 days.

(21) Appl. No.: 12/578,769

(22) Filed: Oct. 14, 2009

(65) Prior Publication Data

US 2011/0088055 A1    Apr. 14, 2011

(51) Int. Cl.
| | |
|---|---|
| H04N 5/445 | (2011.01) |
| H04N 7/10 | (2006.01) |
| H04N 7/025 | (2006.01) |
| G06F 3/00 | (2006.01) |
| G06F 13/00 | (2006.01) |
| H04N 21/435 | (2011.01) |
| H04N 7/173 | (2011.01) |
| H04N 21/235 | (2011.01) |
| H04N 21/475 | (2011.01) |
| H04N 21/4788 | (2011.01) |
| H04N 21/81 | (2011.01) |

(52) U.S. Cl.
CPC ......... *H04N 21/435* (2013.01); *H04N 7/17318* (2013.01); *H04N 21/235* (2013.01); *H04N 21/4753* (2013.01); *H04N 21/4788* (2013.01); *H04N 21/8173* (2013.01)

(58) Field of Classification Search
None
See application file for complete search history.

(56) References Cited

U.S. PATENT DOCUMENTS

| | | | | |
|---|---|---|---|---|
| 7,620,914 | B2 * | 11/2009 | Li et al. ........................ | 715/854 |
| 7,730,216 | B1 * | 6/2010 | Issa et al. ..................... | 709/250 |
| 2003/0217369 | A1 * | 11/2003 | Heredia ....................... | 725/152 |
| 2005/0117883 | A1 * | 6/2005 | Kim et al. ...................... | 386/95 |
| 2006/0095952 | A1 * | 5/2006 | Chung .......................... | 725/136 |
| 2006/0271961 | A1 * | 11/2006 | Jacoby et al. .................. | 725/46 |
| 2007/0079342 | A1 * | 4/2007 | Ellis et al. ...................... | 725/89 |
| 2007/0169165 | A1 * | 7/2007 | Crull et al. .................... | 725/135 |
| 2007/0261071 | A1 * | 11/2007 | Lunt et al. ...................... | 725/13 |
| 2008/0060039 | A1 * | 3/2008 | Kim et al. ..................... | 725/115 |
| 2008/0072247 | A1 * | 3/2008 | Barnard ......................... | 725/32 |
| 2008/0109843 | A1 * | 5/2008 | Ullah ............................ | 725/34 |
| 2008/0127331 | A1 * | 5/2008 | Seidman et al. ............... | 726/21 |
| 2008/0134052 | A1 * | 6/2008 | Davis et al. ................... | 715/744 |
| 2008/0134235 | A1 * | 6/2008 | Kalaboukis .................... | 725/32 |
| 2008/0208963 | A1 * | 8/2008 | Eyal et al. ..................... | 709/203 |
| 2008/0307454 | A1 * | 12/2008 | Ahanger et al. ................ | 725/36 |
| 2009/0094643 | A1 * | 4/2009 | Pickelsimer et al. ........... | 725/39 |
| 2009/0138934 | A1 * | 5/2009 | Aoki et al. .................... | 725/131 |
| 2009/0249415 | A1 * | 10/2009 | Foote ........................... | 725/109 |
| 2009/0254964 | A1 * | 10/2009 | Park et al. .................... | 725/134 |
| 2009/0260072 | A1 * | 10/2009 | Rouskov et al. ................. | 726/9 |
| 2009/0271493 | A1 * | 10/2009 | Boucard ....................... | 709/213 |
| 2009/0300670 | A1 * | 12/2009 | Barish ............................ | 725/13 |

(Continued)

*Primary Examiner* — Jonathan V Lewis (74) *Attorney, Agent, or Firm* — The Marbury Law Group, PLLC (57) ABSTRACT

A system and method for linking the account of a subscriber of a multi-channel video programming distributor (MVPD) network to an account of the subscriber on a social networking site and to receive invitations to follow a page or join a group hosted on a social networking site that is relevant to the video content being displayed on the subscriber's television.

18 Claims, 4 Drawing Sheets

(56) References Cited

U.S. PATENT DOCUMENTS

| | | | |
|---|---|---|---|
| 2009/0313665 A1* | 12/2009 | Rouse | 725/93 |
| 2009/0320101 A1* | 12/2009 | Doyle et al. | 726/4 |
| 2010/0088716 A1* | 4/2010 | Ellanti et al. | 725/32 |
| 2010/0138852 A1* | 6/2010 | Hirsch et al. | 725/13 |
| 2010/0287587 A1* | 11/2010 | Patten et al. | 725/39 |
| 2011/0004898 A1* | 1/2011 | Ritter et al. | 725/32 |
| 2011/0078724 A1* | 3/2011 | Mehta et al. | 725/32 |
| 2011/0162021 A1* | 6/2011 | Lee | 725/93 |
| 2011/0283319 A1* | 11/2011 | Davis et al. | 725/39 |

\* cited by examiner

SYSTEM AND METHOD FOR PRESENTING DURING A PROGRAMMING EVENT AN INVITATION TO FOLLOW CONTENT ON A SOCIAL MEDIA SITE

BACKGROUND

Information provided via networks is "consumed" in vast quantities every day. Such information may be provided in the form of television programming, email, short messages, blogs, and web pages.

The popularity of social media sites has been recognized by purveyors of products and services. By way of illustration, dozens of major cable and broadcast TV shows have started to create "fan pages" on Facebook and Twitter (in addition to their own show-centric websites/blogs). The fan pages provide viewers the opportunity to interact with (to "follow") cast members, writers and other fans, both within and beyond a show's broadcast window. Similarly, producers of branded products created Twitter and Facebook fan pages for their customers as a means to have a two-way dialog with their customer base. The online engagement of fans and customers may take the form of branded online and downloadable interactive applications, games and social communities that can be accessed regularly through multiple screens and devices.

The lines between these various media are also blurring. For example, some multi-channel video programming distributors (MVPDs) provide subscribers access to existing web-based social media platforms (such as Facebook and Twitter) while engaging in a TV viewing experience. The existing access to social media through video access devices replicates many of the text-heavy interactions that are better suited to a laptop or desktop PC (with its QWERTY keyboard, mouse & pointer/cursor) or smartphones (that also have a QWERTY keyboard & mouse, pointer/cursor equivalent). The navigation and data-entry device for a typical digital STB is a remote control that is reliant on the controls afforded by the up/down/right/left arrow keys and the ABCD colored buttons. This makes text entry a sub-optimal experience at best. Additionally, the access to these social networks is not typically contextually relevant to the viewer programming experience.

SUMMARY

Embodiments herein are directed to systems and methods that permit a subscriber of a MVPD to link a social media account to an account with the MVPD and to receive invitations to follow a page or join a group hosted on a social networking site that is relevant to the video content being displayed on the subscriber's television.

In an embodiment, the information may be product information for a product that is identified in, or relevant to, the video content. In another embodiment, the information may be information that is relevant to the video content. By way of illustration and not by way of limitation, the information related to the video content may be related to the plot, the story, a character, and a cast member.

In yet another embodiment, the MVPD may provide social media interaction opportunities to third parties for a fee.

In still another embodiment, the acceptance of an invitation to follow information posted on a social media site results in a communication to a device other than the television on which the interaction is initiated. By way of illustration and not by way of limitation, the acceptance of an invitation may cause a message to be sent to a smartphone, via SMS or HTML email, thus shifting all further interactions regarding the program relevant information to the mobile web. In this embodiment, television viewing is used to drive initial awareness of shows, products, services and brands and the social media site is used to shift that attention over to browser-based screens that are better suited for ongoing interactions.

DETAILED DISCLOSURE

Embodiments herein are directed to systems and methods that permit a subscriber to link a social media account to an account with an MVPD and to receive invitations to follow information posted on a social networking site that is relevant to the video content being displayed on the subscriber's television.

In social networking environments, subscribers typically select links that associate the subscriber's account with pages generated by other subscribers or groups of subscribers. The subscriber selecting the link is the "following" or "joining" subscriber. The "following subscriber" may "follow" the postings of the followed subscribers or the followed groups by visiting the social networking site to see the most recent postings. In some social networking environments, the following subscriber is notified that new content has been posted via a messaging or email system. The notification may also be sent to a mobile device and may include the content itself.

Figure 1:
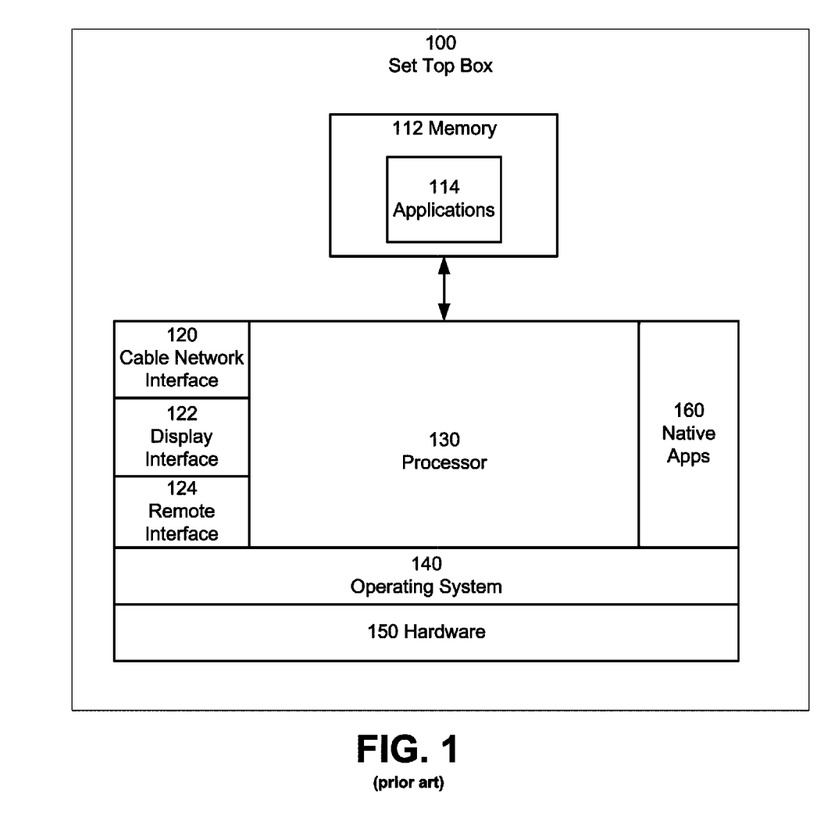
FIG. 1 is a block diagram illustrating components of a set top box.

In the descriptions that follow, the various determinations, computations and operations may be performed using a processor executing software instructions. For example, the processor of a set top box (STB) may be used for this purpose. The functional components of a typical STB are illustrated in FIG. 1.

A set top box (STB) 100 comprises hardware components 150, an operating system 140, various interfaces and a processor 130. In addition to running the operating system 140, the processor 130 is configured to execute applications 114 stored in a memory 112 as well as native applications stored in 160. The applications 114 may be received from a cable head end (not illustrated) via in-band or out-of-band network paths. The applications 114 may be used to perform particular tasks and then terminated. A particular application 114 may also be deleted from memory 112 when the STB 100 has completed a task or when the task is terminated by user interaction with the STB 100.

The STB 100 may interface with in-band or out-of-band network paths via a network interface 120. The STB 100 may interface with a user input device, such as a remote control (not illustrated), via a remote interface 124. The STB 100 may interface with a display device via a display interface 122.

Figure 2:
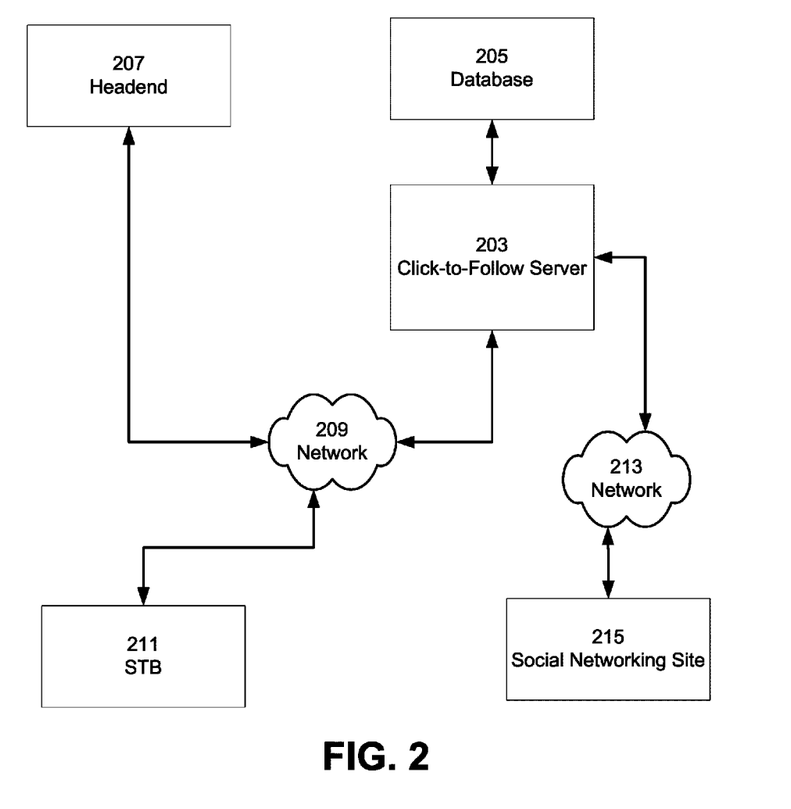
FIG. 2 is a block diagram of a system to provide click-to-follow services to a STB according to an embodiment.

FIG. 2 is a block diagram of a system to provide click-to-follow services to an STB according to an embodiment.

In an embodiment, a headend 207 provides content to a set top box (STB) 211 via a network 209. Headend 207 typically operates processor-based computing devices (not illustrated) that perform various processes related to the receiving and distributing content. In an embodiment, the content provided to STB 211 may include programming content and program related content such as advertisements, product offers, and program information. The program content is provided via data streams. Additionally, the headend 207 may send applications to the STB 211 to provide functionality that is not resident on the STB 211. Applications may be bound to a particular stream, to a program or to a time. A "bound" application is executed only for the life of the object to which it is bound. The life of an unbound application is determined by the application.

A click-to-follow server 203 has access to a database 205 and communicates with the STB 211 via network 209. The click-to-follow server 203 also has access to a social networking site 215 via a network 213.

In an embodiment, the database 205 may include subscriber account information that relates the accounts of the MVPD to the STB 211. While FIG. 2 illustrates a single database, the functions of the database 205 may be performed on a distributed basis by multiple devices that may be physically connected or connected via network. The database 205 may also be integrated with the click-to-follow server 203.

Figure 3:
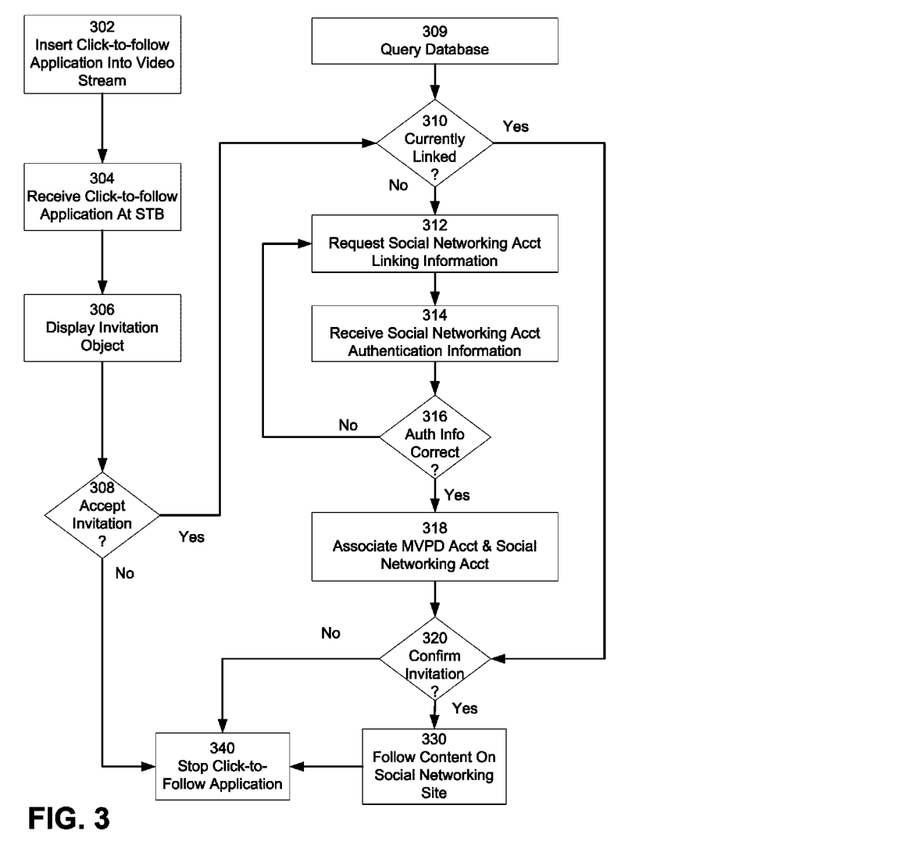
FIG. 3 is a flow diagram illustrating a process by which a click-to-follow invitation may be presented to a subscriber according to an embodiment.

FIG. 3 is a flow diagram illustrating a process by which a click-to-follow invitation may be presented to a subscriber according to an embodiment.

In an embodiment, a click-to-follow application is inserted into a video stream (block 302) at the headend 207.

In an embodiment, the click-to-follow application is an Enhanced TV Binary Interchange Format (EBIF) application. The EBIF application is inserted into the digital TV bit stream of the channel being watched. The set top box 211 may decode the EBIF application using an enhanced TV (ETV) agent or native software (such as Tru2way-compliant software). In an embodiment, the click-to-follow application uses a bound application to provide an invitation (described below) and an unbound application to process the response to the invitation.

The click-to-follow application is received at the STB 211 of a subscriber (block 304). The STB 211 executes the application which causes the STB 211 to display the invitation object (block 306). The invitation comprises a prompt that asks the subscriber whether he or she desires to follow a particular page (or join a particular group) hosted on a social networking site. The STB 211 determines from the user input whether the subscriber has accepted the invitation (block 308).

If the subscriber declines the invitation (that is, the decision in block 308 is "No"), the click-to-follow application is stopped (block 340). In an embodiment, the click-to-follow application may also be stopped if the application times out or if the subscriber manually exits the invitation. If the subscriber accepts the invitation (that is, the decision in block 308 is "Yes"), the click-to-follow application causes the STB 211 to send a query to the click-to-follow server 203 to obtain subscriber MVPD account information (block 309) from the database 205. The click-to-follow server 203 determines whether the subscriber has previously linked one or more MVPD accounts to a social networking account of the social networking site on which the page/group is hosted (block 310).

If the subscriber has not previously linked an MVPD account to a social networking account (that is, the decision in block 310 is "No"), the click-to-follow server 203 responds to the query with a notification that informs the click-to-follow application that the subscriber has not previously linked an MVPD account to a social networking account. The click-to-follow application causes the STB 211 to prompt the subscriber to provide information that is necessary to link a subscriber's account with the social network site to one of the subscriber's MVPD accounts (block 312). The subscriber may at this juncture decline to link a subscriber's MVPD account with the social networking account (not illustrated), or elect one of the subscriber's MVPD accounts to link with a subscriber account on the social networking site.

The click-to-follow application causes the STB 211 to send the linking information provided by the subscriber to the click-to-follow server 203 (block 314). The click-to-follow server 203 checks the linking information to determine that it is correct 316. In an embodiment, the click-to-follow server 203 validates the linking information by attempting to use the linking information to log on to the social networking site. If the linking information is incorrect (that is, the decision in block 316 is "No"), the process returns to bloc 312 and the subscriber is again requested to provide linking information. If the linking information is correct (that is, the decision in block 316 is "Yes"), the social networking account is linked with the selected MVPD account (block 318).

The click-to-follow application causes the STB 211 to again display the invitation and to confirm that the subscriber wants to follow the page or join the group identified in the invitation (block 320). If the subscriber elects not to follow/join (that is, the decision in block 320 is "No"), the click-to-follow application is stopped (block 340). If the subscriber confirms acceptance of the invitation (that is, the decision in block 320 is "Yes"), the subscriber account on the social network site is set to follow the page or join the group identified in the invitation on the social networking site (block 330).

In an embodiment, the click-to-follow application is responsive to user input. In an embodiment, the user input is provided via a remote control that signals the STB 211 through a wired or wireless connection. In an embodiment, the social networking linking information may include a user identifier, a password and a session ID provided by the social networking site 215. In an embodiment, the account linking information is provided to the STB 211 via a user input device such as a remote control device. In an embodiment, the click-to-follow application causes the STB 211 to display a virtual keyboard that may be used by the subscriber to input the account linking information. The subscriber enters the account linking information, which information is received by the STB 211 (block 314).

In an embodiment, the linking process is managed by the click-to-follow server 203. In this embodiment, the click-to-follow server 203 uses an open API to provide the required credentials to the social networking site 215 to log into the site. The click-to-follow server 203 then executes an API to follow the page or join the group identified in the click-to-follow invitation.

If the subscriber's MVPD account was previously linked to the subscriber's social networking account (that is, the decision in block 310 is "Yes"), the click-to-follow application causes the STB 211 to confirm the invitation (block 320). If the subscriber elects not to confirm the invitation (that is, the decision in block 320 is "No"), the click-to-follow application is stopped (block 340). If the subscriber confirms the invitation (that is, the decision in block 320 is "Yes"), the account on the social network site is set to follow the page or join the group identified in the invitation on the social networking site (block 330).

In another embodiment, the subscriber may pre-link the subscriber's MVPD account to the subscriber's social networking account via a web page operated by the MVPD prior to the interaction with the STB. In this embodiment, the decision at block 310 will be "Yes" as to the social networking sites that the subscriber has pre-linked.

In another embodiment, the subscriber with multiple MVPD accounts may be provided an opportunity to link the social networking account information with more than one MVPD account. Referring again to FIG. 3, prior to confirming the invitation (block 318) the subscriber may be provided a list of available MVPD from which the subscriber may select one or more MVPD accounts to link to the subscriber's social networking account.

In yet another embodiment, a subscriber may link multiple social networking accounts to an MVPD account.

In still another embodiment, the subscriber may manage his or her MVPD—social networking account associations. In this embodiment, a subscriber may choose from a list of MVPD accounts and a list of social networking accounts to create associations between MVPD accounts and social network accounts. The account management functions may be performed via an application that may be displayed by the STB or via a web interface that may be accessed via a computing device.

In another embodiment, a subscriber may access the database to de-link subscriber and social networking accounts and to opt out of receiving (or displaying) invitation objects. The de-linking and opt-out functions may be performed via an application that may be displayed by the STB or via a web interface that may be accessed via a computing device.

In an embodiment, the social network account linking information may require an identifier or code obtained by the subscriber from the social networking site. The subscriber may obtain the identifier or code from the social network site in an email, a text message, an IM, or other communication.

In an embodiment, a click-to-follow service is implemented as an opt-in application/service that leverages click-to-follow as a pre-qualified lead generation tool for advertisers. In this embodiment, an MVPD receives revenue for presenting invitations to subscribers for pages of advertisers and for generating click-throughs of those pages.

Figure 4:
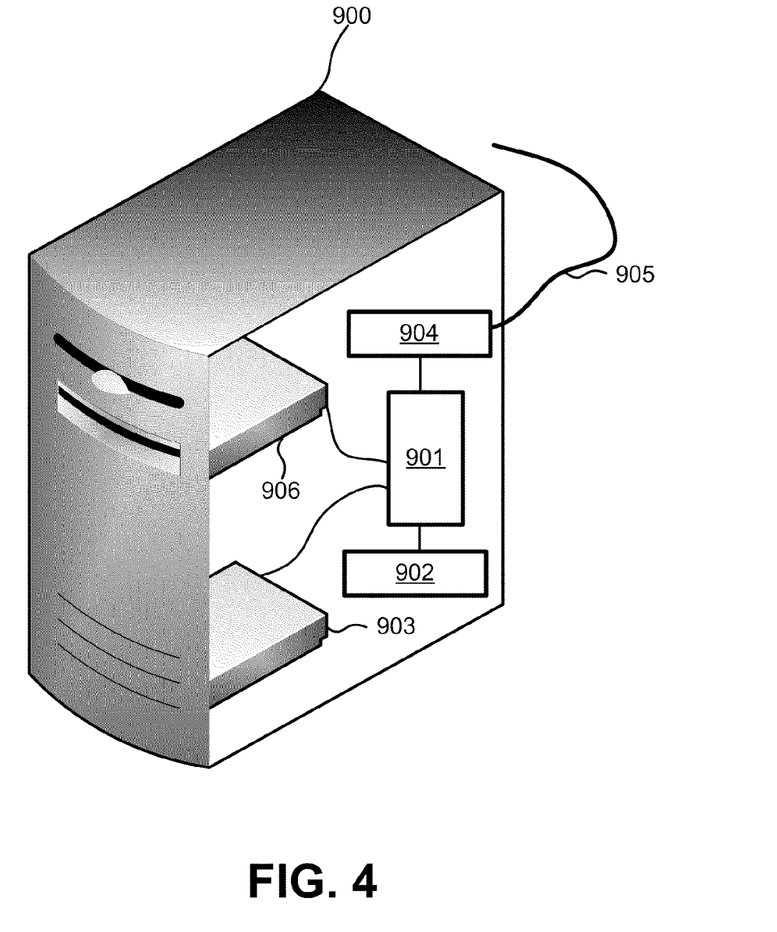
FIG. 4 is a block diagram illustrating components of a server.

A number of the aspects described above may be implemented with any of a variety of server devices. As used herein, a "server" encompasses a computing device that may be configured to interact in an automated fashion with other devices over a network to serve content and web pages, to issue responses to communications from other network devices and to respond to queries from other network devices. Such a server 900 is illustrated in FIG. 4 and typically includes a processor 901 coupled to volatile memory 902 and a large capacity nonvolatile memory, such as a disk drive 903. The server 900 may also include a floppy disk drive and/or a compact disc (CD) drive 906 coupled to the processor 901. The server 900 may also include a number of connector ports 904 coupled to the processor 901 for establishing data connections with network circuits 905. The processor 901 is capable of executing applications that may be accessed from disk drive 903, CD drive 906 or via the network connector ports 904.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of the computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as cellular, infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically and discs reproduce data optically with lasers. Combinations of the above should also be included within the scope of computer-readable media. Additionally, the operations of a method or algorithm may reside as one or any combination or set of codes and/or instructions on a machine-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A system for providing program related content via a social networking site, the system comprising:
   a headend operated by a multi-channel video programming distributor (MVPD);
   a video termination device in communication with the headend via a network operated by the MVPD;
   a click-to-follow server; and
   a datastore, wherein the datastore comprises linking information associated with an identifier of the video termination device and wherein the linking information comprises data sufficient to provide access to an account of the subscriber on the social networking site,
   wherein the headend comprises a processor configured to perform operations comprising:
      identifying program content in a video stream being provided to a subscriber of the MVPD;
      identifying content available on a social networking site that is related to the program content and on which the subscriber has an account;
      generating a click-to-follow application comprising a bound portion having a first lifetime based on a second lifetime of an object to which the click-to-follow application is bound and an unbound portion, wherein the bound portion comprises an invitation to receive program related content on the social networking site and wherein the unbound portion comprises instructions to process a response to the invitation; and
      inserting the click-to-follow application in the video stream, and
   wherein the video termination device comprises a processor configured to perform operations comprising:
      determining whether the first life of the bound application has expired;
      discarding the click-to-follow application when the life of the bound application has expired;
      executing the invitation according to the unbound portion to determine whether the invitation is accepted when the lifetime of the bound application has not expired;
      discarding the click-to-follow application when the invitation is not accepted; and
      sending a query to the click-to-follow server when the subscriber accepts the invitation, and
   wherein the click-to-follow server comprises a processor configured to perform operations comprising:
      receiving the query from the video termination device, wherein the query comprises the identifier of the video termination device;
      using the identifier of the video termination device to obtain the linking information from the datastore;
      accessing the subscriber account on the social media site using the linking information; and
      modifying the subscriber account on the social media site to follow a page or join a group identified in the invitation.

2. The system of claim 1, wherein the object is selected from the group consisting of a program video stream, a program and a time.

3. The system of claim 1, wherein the content related to the video content is selected from the group consisting of an advertisement, a product offer, program information, a plot summary, a story summary, a character description, and a cast member biography.

4. The system of claim 1, wherein the linking information includes at least one data element selected from the group consisting of a user identifier, a password and a session ID provided by the social networking site.

5. The system of claim 1, wherein the processor of the click-to-follow server is configured to perform operations further comprising:
   sending the video termination device a notice when the subscriber linking information does not allow access to the social network account.

6. A method for providing program related content via a social networking site, the method comprising:
   identifying by a first processor program content in a video stream being provided to a subscriber of a multi-channel video programming distributor (MVPD);
   identifying by the first processor content available on a social networking site that is related to the program content and on which the subscriber has an account;
   generating by the first processor a click-to-follow application comprising a bound portion having a first lifetime based on a second lifetime of an object to which the click-to-follow application is bound and an unbound portion, wherein the bound portion comprises an invitation to receive program related content on the social networking site and wherein the unbound portion comprises instructions to process a response to the invitation;
   inserting the click-to-follow application in the video stream;
   receiving at a second processor on a video termination device the click-to-follow application;
   determining by the second processor whether the first life of the bound application has expired;
   discarding by the second processor the click-to-follow application when the life of the bound application has expired;
   executing by the second processor the invitation according to the unbound portion to determine whether the invitation is accepted when the lifetime of the bound application has not expired;
   discarding by the second processor the click-to-follow application when the invitation is not accepted;
   sending by the second processor a query to a click-to-follow server when the subscriber accepts the invitation;
   receiving by a third processor operation on the click-to-follow server the query, wherein the query comprises an identifier of the video termination device;
   using by the third processor the identifier of the video termination device to obtain linking information, wherein the linking information comprises data sufficient to provide access to an account of the subscriber on the social networking site;
   accessing by the third processor the subscriber account on the social media site using the linking information; and modifying by the third processor the subscriber account on the social media site to follow a page or join the group identified in the invitation.

7. The method of claim 6, wherein the object is selected from the group consisting of a program video stream, a program and a time.

8. The method of claim 7, wherein the content related to the video content is selected from the group consisting of an advertisement, a product offer, program information, a plot summary, a story summary, a character description, and a cast member biography.

9. The method of claim 7, wherein the subscriber linking information is selected from the group consisting of a user identifier, a password and a session ID provided by the social networking site.

10. The method of claim 7 further comprising:
sending by the third processor a notice to the video termination device when the subscriber linking information does not allow access to the social network account.

11. A system for providing program related content via a social networking site, the system comprising:
a headend operated by a multi-channel video programming distributor (MVPD),
wherein the headend comprises a processor configured to perform operations comprising:
identifying program content in a video stream being provided to a subscriber of the MVPD;
identifying content available on a social networking site that is related to the program content and on which the subscriber has an account;
generating a click-to-follow application comprising a bound portion having a first lifetime based on a second lifetime of an object to which the click-to-follow application is bound and an unbound portion, wherein the bound portion comprises an invitation to receive program related content on the social networking site and wherein the unbound portion comprises instructions to process a response to the invitation; and
inserting the click-to-follow application in the video stream;
a video termination device in communication with the headend via a network operated by the MVPD, wherein the video termination device comprises a processor configured to perform operations comprising:
determining whether the first life of the bound application has expired;
discarding the click-to-follow application when the life of the bound application has expired;
executing the invitation according to the unbound portion to determine whether the invitation is accepted when the lifetime of the bound application has not expired;
discarding the click-to-follow application when the invitation is not accepted;
acquiring linking information from a user input device when the invitation is accepted;
validating that the subscriber linking information allows access to the social network account; and
sending a query to the click-to-follow server when the subscriber linking information allows access to the social network account, wherein the query comprises the linking information; and
a click-to-follow server, comprising a processor configured to perform operations comprising:
receiving the query from the video termination device;
accessing the subscriber account on the social media site using the linking information; and
modifying the subscriber account on the social media site to follow a page or join the group identified in the invitation.

12. The system of claim 11, wherein the object is selected from the group consisting of a program video stream, a program and a time.

13. The system of claim 11, wherein the content related to the video content is selected from the group consisting of an advertisement, a product offer, program information, a plot summary, a story summary, a character description, and a cast member biography.

14. The system of claim 11, wherein the linking information is selected from the group consisting of a user identifier, a password and a session ID provided by the social networking site.

15. A method for providing program related content via a social networking site, the method comprising:
identifying by a first processor program content in a video stream being provided to a subscriber of a multi-channel video programming distributor (MVPD);
identifying by the first processor content available on a social networking site that is related to the program content and on which the subscriber has an account;
generating by the first processor a click-to-follow application comprising a bound portion having a first lifetime based on a second lifetime of an object to which the click-to-follow application is bound and an unbound portion, wherein the bound portion comprises an invitation to receive program related content on the social networking site and wherein the unbound portion comprises instructions to process a response to the invitation;
inserting by the first processor the click-to-follow application in the video stream;
receiving at a second processor on a video termination device the click-to-follow application;
determining by the second processor whether the first life of the bound application has expired;
discarding by the second processor the click-to-follow application when the life of the bound application has expired;
executing by the second processor the invitation according to the unbound portion to determine whether the invitation is accepted when the lifetime of the bound application has not expired;
discarding by the second processor the click-to-follow application when the invitation is not accepted;
acquiring by the second processor linking information from a user input device when the invitation is accepted;
validating by the second processor that the subscriber linking information allows access to the social network account;
sending by the second processor a query to the click-to-follow server when the subscriber linking information allows access to the social network account, wherein the query comprises the linking information;
receiving by a third processor operated on the click-to-follow server the query;
accessing by the third processor the subscriber account on the social media site using the linking information; and
modifying by the third processor the subscriber account on the social media site to follow a page or join the group identified in the invitation.

16. The method of claim 15, wherein the object is selected from the group consisting of a program video stream, a program and a time.

17. The method of claim 15, wherein the content related to the video content is selected from the group consisting of an advertisement, a product offer, program information, a plot summary, a story summary, a character description, and a cast member biography.

18. The method of claim 15, wherein the linking information is selected from the group consisting of a user identifier, a password and a session ID provided by the social networking site.

\* \* \* \* \*